United States Patent [19]

Velasco

[11] Patent Number: 4,797,044
[45] Date of Patent: Jan. 10, 1989

[54] IMPROVEMENTS INTRODUCED IN THE ANCHORING SYSTEMS BY MEANS OF THREADED BOLTS

[76] Inventor: Vincente S. Velasco, Canillas 93 4°-a, Madrid, Spain

[21] Appl. No.: 926,401

[22] Filed: Oct. 30, 1986

[30] Foreign Application Priority Data

Oct. 31, 1985 [ES] Spain ...................................... 548461
Oct. 27, 1986 [EP] European Pat. Off. ......... 86500001.2

[51] Int. Cl.⁴ ............................................. F16B 13/06
[52] U.S. Cl. ...................................... 411/51; 411/55; 411/45
[58] Field of Search ............... 411/32, 33, 45, 48, 411/43, 55, 54, 51, 53, 57, 60

[56] References Cited

U.S. PATENT DOCUMENTS

| | | | |
|---|---|---|---|
| 3,171,322 | 3/1965 | Kaplan | 411/57 |
| 3,855,896 | 12/1974 | Kaufman | 411/60 |
| 4,519,735 | 5/1985 | Machtle | 411/55 |
| 4,560,311 | 12/1985 | Herb et al. | 411/54 |
| 4,640,654 | 2/1987 | Fischer et al. | 411/55 |
| 4,678,383 | 7/1987 | Bergner | 411/55 |

FOREIGN PATENT DOCUMENTS 6507571 8/1966 Netherlands ........................ 411/45

*Primary Examiner*—Neill Wilson
*Attorney, Agent, or Firm*—Michael J. Striker

[57] ABSTRACT

An anchoring system in concrete having a predrilled hole with an undercut. The anchoring system includes a cylindrical rod that is threaded at one end and has a trunk conical head at the other end. A sleeve extends over the lower portion of the cylindrical rod above the trunk conical head. The cylindrical rod is inserted into the hole so that the sleeve is adjacent to the undercut. The sleeve is fixed against being subsequently withdrawn. The cylindrical rod is then rotated relative to the sleeve thereby lifting up the trunk conical head into the sleeve so as to press against and thereby expand the sleeve outward against the walls of the undercut.

26 Claims, 4 Drawing Sheets

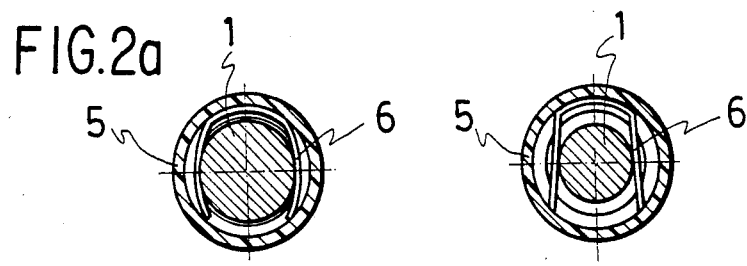
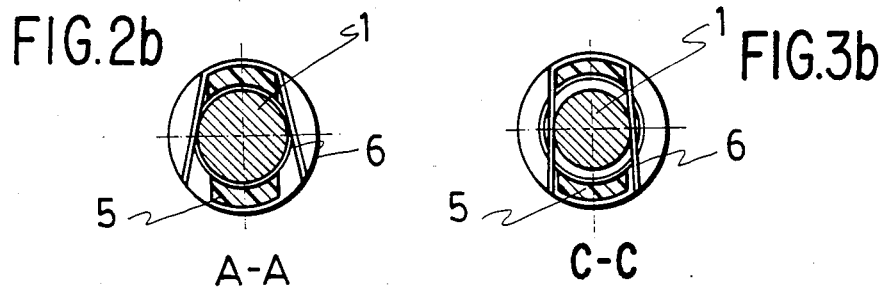
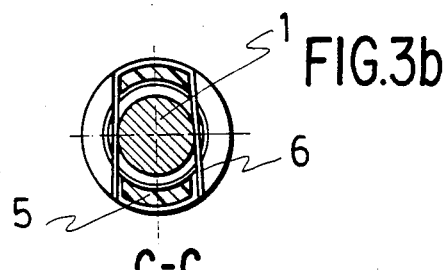
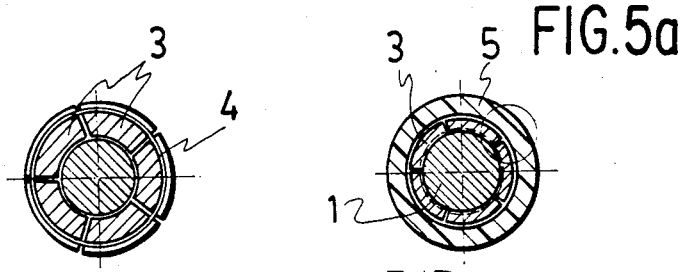
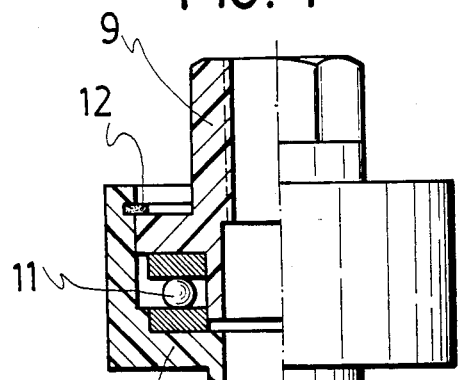
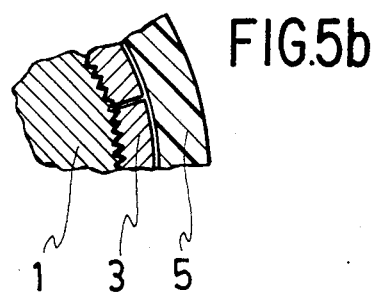

IMPROVEMENTS INTRODUCED IN THE ANCHORING SYSTEMS BY MEANS OF THREADED BOLTS

BACKGROUND OF THE INVENTION

The present invention refers, as expressed by the title of this specification, to a series of improvements introduced in the anchoring systems through threaded bolts, intended to be installed in drilled holes previously made on blocks, tiles or walls of concrete or brick, stone blocks, etc. which drilled holes, at a certain depth, have a cavity of a diameter bigger than the drilled hole itself and on which cavity the axial fixation of the anchoring is made. These cavities may have any shape, though normally they are an annular hole which surface closer to the drilled hole has a trunk-conical shape. Not only the drilled hole but also the annular hole will be made by any conventional means and with the use of any adequate tool, and the performance of said drill is left out of the scope of the present invention.

SUMMARY OF THE INVENTION

In a more concrete mode, the improvements preconized are specially applicable to anchoring systems on concrete; for which hereinafter this material is to be cited as a constituent of the receiving element of the bolt, though, as previously said, it may be any other material.

The improvements preconized are especially applicable to anchoring bolts provided with a threaded sector in one of its ends, with which the corresponding tightening nut cooperates for the object to be fastened, assisted by a washer, such improvement being centered in the existence at the opposite end of the stud, of a trunk-conical head, longitudinally striated, divergent with respect to the body of the stud and as from same, being said head approximately coincident, from the dimensional point of view, and concretely in correspondence with its maximum diameter belonging to its bigger and free basis, with the drilled hole of the concrete in which the bolt is to be installed.

The smaller basis of said head presents a diameter which coincides with that of a first sector of the stud, which determines one neck, also longitudinally striated, which diameter is, in turn, lower than the rest of the stud.

On the said striated neck, several pieces are installed, which in their whole define a cylindrical bush with its internal surface striated, and with its external surface provided with a perimetral groove on which is located an elastic ring, which holds said pieces adapted against the neck of the stud, and which perimetral groove makes up, besides, a weakening line for said pieces, which permits that same, in the operational phase of fixation of the bolt, be obtusely bent outwards, until defining an angle which is determined by the conicity of the trunk-conical head of the stud.

Besides, these pieces show, also in their external face, at their end opposite to that of incidence over the cited head, an external perimetral offset, intended to the coupling of said pieces at the nozzle of a sleeve, in turn internally offset and which is adapted to the sector of bigger diameter of the stud, affecting it in all its length.

At the same time, this sleeve incorporates an external perimetral groove, close to its receptor end of the set of pieces cited, in which groove is installed an elastic nozzle which legs press the side surface of the stud through two diametrally opposite areas in which said groove perforates the walls of the sleeve, having said fork the end of, during the mounting of the bolt, moving along the stud until reaching the echeloning defined by the neck of same, at which situation it recuperates elastically, fixing this way the stud and the sleeve axially, and acting consequently as a link between these elements.

To attain this axial fixation between stud and sleeve at said stud, concretely at the linking point between its body and its neck, an abrupt echeloning is defined, preferably on a right angle, so that once the arms of the fork close elastically on the neck, there exists the possibility of uncoupling before an axial traction on the stud.

It should be highlighted as well, in accordance with another improvement preconized, that the length of the pieces associated to the neck of the stud, and more concretely the length of same defined between the folding groove and its end adjacent to the trunk-conical head of the stud, is the adequate one so that when folded they result laterally overlapping in a dimension determined by the transverse dimensions of the cavity of the drill in which the bolt is to be installed, whilst the length of said pieces, between the cited folding groove and the end opposite to the head of the stud, the adequate one for it to exert an internal pressure in the mostly tensioned area of the walls of the drill, avoiding its collaspe.

In a similar way, the folding groove existing in the external face of these pieces has the adequate dimension to allow that the folding to the outside be made with an angle equivalent to that of conicity of the head of the stud.

The transverse sections of the pieces grouped on the neck of the stud, define sectors of circular crown, which at the area comprised between the folding groove and the end opposite to the head of the stud, have constant and equal internal and external diameters, respectively, to those of the neck of the stud and to those of the bigger base of its head, so that all these elements make up a cylinder, while the other sector of said piece may have the same section as the rest of the piece or have diameters varying respectively, increasing towards its free end, with the same formula of variation as the diameters of the trunk-conical head of the stud and of the cavity of the drilled hole, for which when folding these areas of the pieces during the installation of the bolt, they show internal and external difficulties which constitute cone trunks equal to those which form the head of the stud and the cavity of the drilled hole in which the bolt is installed.

Another improvement preconized is centered in the fact that the end areas of the internal face of said pieces have longitudinal grooves which gear with others that exist at the head and neck of the stud, which may have been incised previously, but in a similar way, if the enveloping pieces are of a material softer than the stud and may be produced during the installation of the bolt by the pressure to which they are submitted. It has also been set forth that the cited offset end of these pieces be introduced between the sleeve and the neck of the stud, with the necessary adjustment to hinder the radial movement of said pieces, avoiding their ungearing.

Going back again to the elastic fork, same presents a separation between its arms equal to the diameter of the neck of the stud, for which it recuperates elastically upon reaching this area, closing on it when the folding of the group of pieces which surround said neck is completed, setting forth the axial retention previously cited.

In this sense, there also exists the possibility that the cited fork be housed in a groove made at the sine of the sleeve, in which case the latter will lack the two drillings of the sleeve.

As a complement of the structure described and like other of the improvements preconized, it has been set forth that for the folding of the said set of pieces which houses the neck of the stud, a complementary tooling be used, made up by a threaded cylindrical piece, threaded internally, in coincidence with the thread of the stud, and this piece, at one of its edges incorporates a polygonal head, to be driven through a key, and that on the other offers a plain frontal contact surface, through an axial bearing or anti-friction bush, on a second piece, the latter with two plain faces, one in which the contact cited with the first piece is established, and another from which overlaps a small neck which internal and external diameters are respectively the same to those of the sleeve, and these two pieces which make up the tooling are kept coupled through an elastic ring.

In this sense, the length of the neck of the second piece of such a tooling, is the adequate so that, by screwing the tooling to the stud until the neck makes contact with the sleeve and introducing the bolt in the drilled hole in which it must be installed, so that the piece which bears said neck makes contact with the surface of the body, the groove of the pieces associated to the neck of the stud, is opposed to the initial area of the cavity which exists in the drilled hole, being the total length of the tool the adequate one so that the end of the stud be at level with the end of the first piece of the tool, when the folding provided for the cited pieces which envelope the neck is completed.

To complement the description that is being made and in order to help to a better understanding of the characteristics of the invention, we enclose herewith as an integral part of the specification herein, a set of drawings in which, with an illustrative but not limitative character, the following has been represented:

BRIEF DESCRIPTION OF THE DRAWINGS

FIGS. 2a and 2b, show a cross-sectional section of the bolt at level of the elastic nozzle, in accordance with the two possibilities provided to the purpose, one in which said fork is internal to the sleeve and another in which it is external to same all of it in accordance with the A—A cutting line of FIG. 1.

FIGS. 3a and 3b, show the same detail of the previous figure, in its two versions, at the end of the fastening of the anchoring, concretely when the cited fork has reached the neck of the stud.

FIG. 4 shows another cross-sectional view of the bolt, in this case made at level of the perimetral groove of the group of pieces which surround the neck of the stud, in which is located the elastic retention ring for same, as per the C—C cutting line of FIG. 1.

FIGS. 5a and 5b, show another cross-sectional view of the stud, in accordance with the B—B cutting line of FIG. 1, concretely at the level of the linking area between this group of pieces and the sleeve, having it been represented a considerably magnified view in which are noticed the complementary indentations between the cited group of enveloping pieces of the neck and the neck itself.

FIG. 6 shows a side elevation view and in section at one fourth of the tool set forth for the implantation and fixation of the anchoring.

DESCRIPTION OF THE PREFERRED EMBODIMENTS

Figure 1:
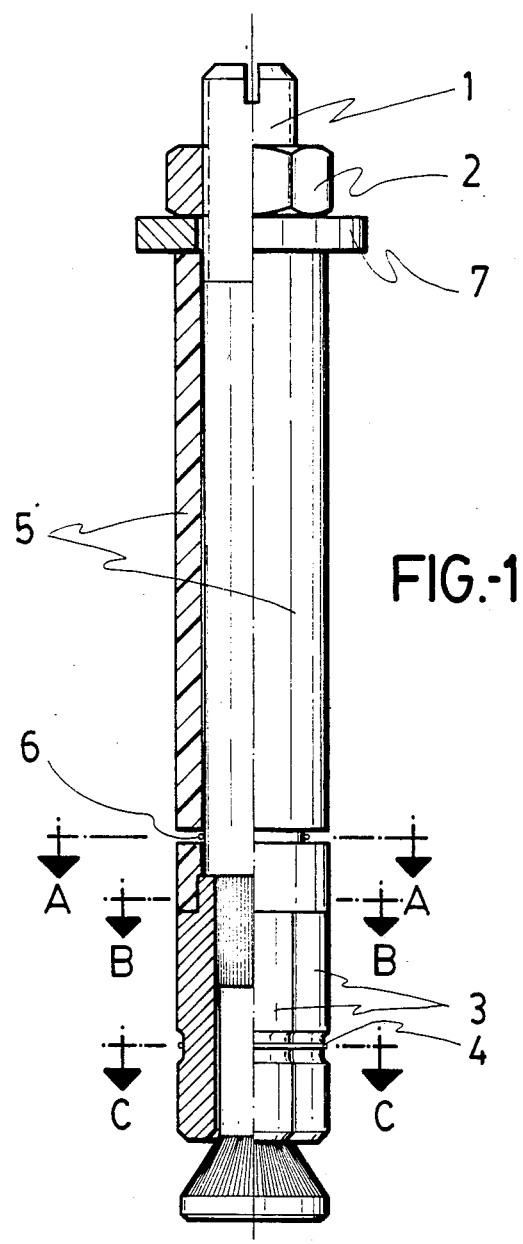
FIG. 1, shows a side elevation view and in section at one fourth of an anchoring threaded bolt, made in accordance with the object of the present invention.

On view of these figures, it can be noted how the improvements that are preconized are based in the following:

The stud (1) is a cylindrical rod that is threaded at one of its ends and on the other has a trunk-conical head. At the threaded area of the stud is installed the nut (2) and the washer (7), through which are fastened the elements that are to be fastened with the anchoring bolt to the concrete wall or tile, brick, etc. At the threaded end of the stud (1) there is a slot or similar thing, to fasten it with a screwdriver or with the corresponding key, when initiating the tightening of the nut. Close to the trunk-conical head of the stud (1) it has a neck, that is, a cylindrical area which diameter is less than that of the rest of the stud. The smaller base of the trunk-conical head has the same transverse section than the neck and is adjacent to it. The bigger base, which constitutes the end of the stud, is bigger than the transverse section of the rest of the stud and is approximately the same (with the necessary clearance) as the drilled hole in which the anchoring bolt is installed.

Around the neck of the stud (1) are located several pieces (3) equal among themselves and with a basically prismatic shape, which lengths are the same as that of the neck. These pieces (3) have at their two ends, longitudinal grooves at the internal face. At the end adjacent to the sleeve (5) they have, at the external face, an offset which allows that this offset end be introduced in the sleeve (5) being adjusted between it and the throat of the stud (1).

At the side surface of the trunk-conical head of the stud (1), there are longitudinal grooves which gear with those existing at one of the ends of the pieces (3), making up a system which hinders the rotation of the stud (1), during the tightening of the nut (2) for the same purpose, the neck of the stud has, at the area opposite the head of the stud, longitudinal grooves which gear with pieces (3) at their other end. The length of the grooves existing at the neck is enough for said gearing to be held after the movement of the stud (1) relative the bush (5), during the installation of the bolt, as hereinafter described.

This configuration constitutes, a double effect anti-rotation system: on one part, it hinders the parts (3) to rotate on themselves as their end is adjusted between the edge of the sleeve (5) and the neck of the stud (1) and on the other, it hinders the stud (1) to rotate when tightening the mounting tool or the nut (2), as said stud (1) is geared to the pieces (3) and these remain fixed in the concrete by the pressure they exert on it. The stud (1) cannot be ungeared from the pieces (3) as therefor these pieces should move radially towards the outside, which is hindered by the adjustment with which the edge of the pieces (3) is introduced between the sleeve (5) and the neck of the stud (1).

The gearing of the grooves of the pieces (3) in those of the neck and in those of the head of the stud (1) is favoured by the forces which are exerted between both when folding the pieces (3) during the installation of the bolt.

The grooves of the pieces (3) may be previously cut or, if the material of which they are made is softer than that of the stud (1) they form during the installation of the bolt, by the pressure which the stud (1) exerts on it, to fold them as hereinafter explained.

The double gearing of the pieces (3) with the neck and with the head of the stud (1) avoids these pieces (3) to be crossed regarding the axle of the stud (1) as it might happen if they were geared to it in only one of its ends.

Figures 7, 8:
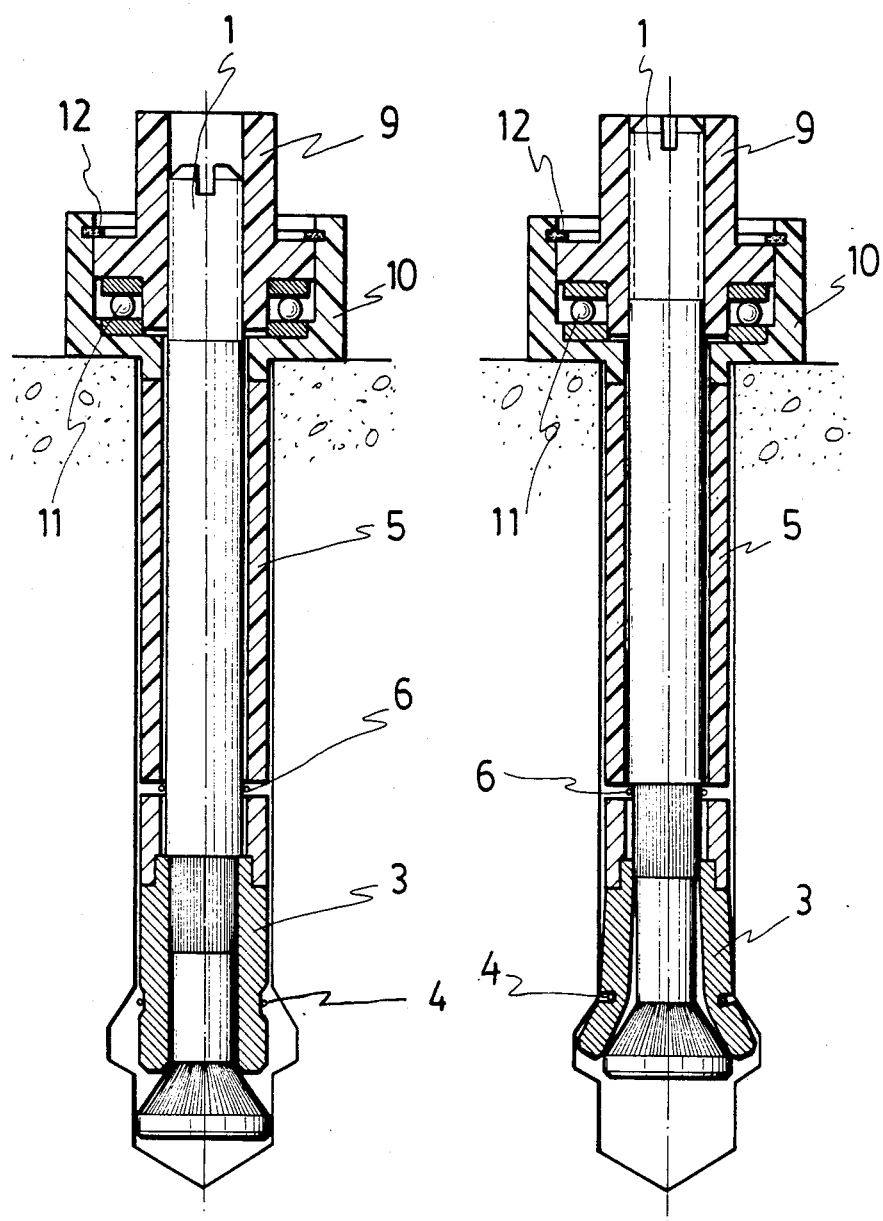
FIG. 7 shows a side elevation view of an anchoring bolt, duly housed at a hole previously made at a concrete wall, being coupled to said bolt the tool represented in the previous figure, and all of it under conditions of starting the corresponding fixation.
FIG. 8 shows, as per a representation similar to that of FIG. 7, the location of the bolt at the end of said operational phase of fixation, concretely when the terminal sector of the pieces associated to the neck of the stud has been deformed, radially, but still the working tool associated to the stud is yet held.
Figure 9:
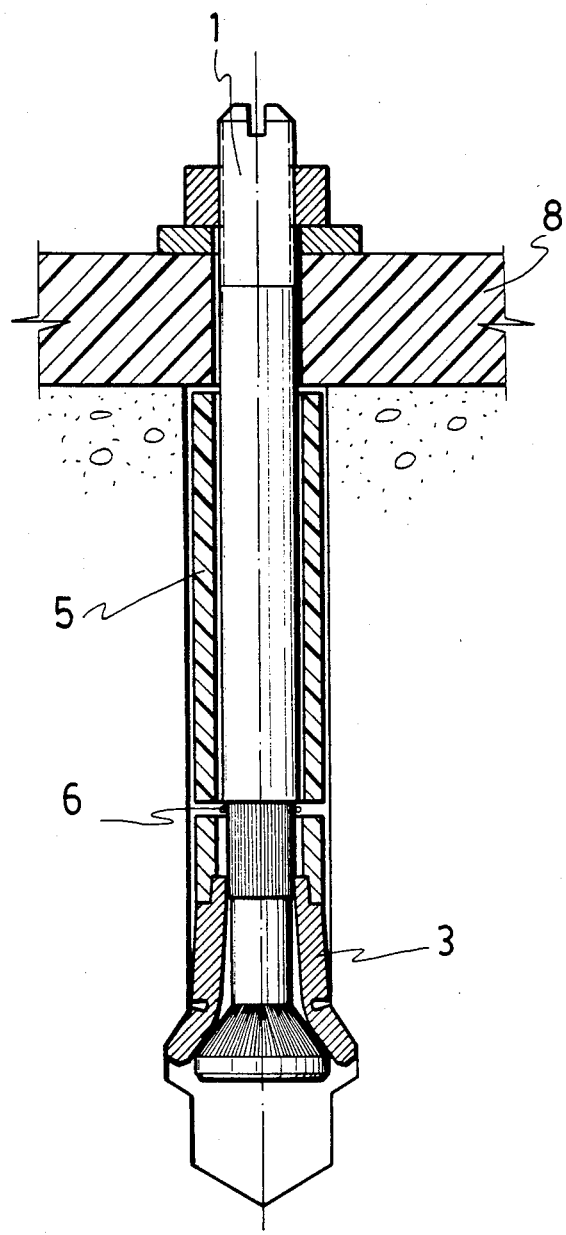
FIG. 9 shows, finally, the same assembly of the previous figure after the elimination of said tool and its substitution for the piece to be fastened by the anchoring in question.

The pieces (3) have, at their external surface, a transverse slot (see FIG. 4) which has a double task which serves as housing to the circular elastic ring (4) through which the pieces (3) are held in their position around the neck of the stud (1) and allows to fold the end of the pieces (3) towards the outside an angle the same as that of conicity of the trunk-conical heads of the stud, during the installation of the bolt (see FIG. 8). Therefor, this slot or groove A has the necessary depth and width.

The groove divides the pieces (3) in two different shape areas; as described hereunder.

The transverse section of the pieces (3) between the groove for folding and its end adjacent to the sleeve (5) is a circular crown sector, which internal and external diameters are respectively the same to that of the throat of the stud (1) and to that of the bigger base of the trunk-conical head of said stud (1). The circumferential dimension of the pieces (3) is such that, when installed around the neck of the stud (1), the perimeter of them all completes a cylinder.

The pieces (3) between the groove for folding and its end adjacent to the trunk-conical head of the stud (1) may have two alternative shapes: either a prismatic shape the same as the rest of the piece (3) or a shape such that, when the piece is folded through the groove of the angle set forth, the internal and external surfaces of this area form cone trunks, which conicity angles are the same respectively to that of the trunk-conical head of the stud (1) and to that of the cavity of the drilled hole in which the anchoring bolt is installed. To attain this, before making the cited folding, the transverse sections of the pieces (3) in this area are made up by sectors of circular crowns which diameters vary respectively along the length of the piece (3) with the same formula of variation as the diameters of the trunk-conical head of the stud and of the cavity of the drilled hole. In this latter alternative a total contact of the folded end of the pieces (3) is obtained, with the trunk-conical head of the stud and with the surface of the cavity of the drilled hole.

The length of the pieces (3) between the groove for folding and its edge adjacent to the trunk-conical head of the stud (1) is the adequate one so that, when folding said pieces, the angle previously cited, its ends overlap laterally a dimension that is determined by the width of the cavity existing in said drilled hole.

The area of the pieces (3) comprised between the groove for folding and its end adjacent to the sleeve (5) produces a radial pressure in the walls of the drilled hole made on the concrete, which avoids that said walls fall towards the inside as a consequence of the force that the rest of the pieces (3) exert on the cavity of the drilled hole. Therefore, its length is the adequate one so that they cause pressure in the area to which, in accordance with the theories of resistance of materials, are produced the greatest efforts.

The sleeve (5) is a cylindrical, hollow piece which internal and external diameters are respectively the same to the general diameter of the stud (1) and to the diameter of the bigger base of its trunk-conical head (and therefore it is also the same as the drilled hole in which the bolt is installed). Its length is the adequate one so that, when levelled with the surface of concrete (with the tolerance hereinafter indicated) the groove of the pieces (3) be opposed with the beginning of the cavity of the drilled hole.

The bush (5) on its external face, has a circumferential groove in which an elastic fork (wire or strap) (6) is housed, U shaped. The groove perforates the wall of the sleeve in two diametrally opposed areas through which the two legs of the fork (6) make contact on the stud (1). The task of this fork is that, when the stud (1) moves with respect to the sleeve (5), to fold the pieces (3) during the installation of the bolt, the two legs of the fork get closed around the neck of the stud (1) (see FIGS. 2 and 3) when the folding of the said pieces (3) is completed. This way, the stud (1) and the sleeve (5) are seized between themselves, and it is hindered that the stud (1) falls to the depth of the drilled hole (when the bolt is installed on floors) or that the sleeve (5) comes out of the drilled hole (when the bolt is installed on roofs) and it is avoided that the pieces be misplaced (3) once folded. The separation between the two legs of the U is deformed (see FIG. 2) when opposed to the normal area of the stud, and this deformation is elastically recuperated when opposed with the throad of the stud (see FIG. 3).

The groove is located at the bush (5) in the position necessary for the fork (6) to reach the beginning of the throat of the stud (1) when the folding of the pieces (3) is completed.

The echelon which the stud has at the initiation of the neck is abrupt (normally on a right angle) so that once the fork (6) has been closed, it may not open again.

In another alternative solution, the fork (6) could be installed in a groove located inside the bush. In this solution it would not be necessary that the groove perforated the walls of the sleeve (5).

The anchoring bolt made up as previously described is adequate to be installed in a drilled hole having a cavity in its depth (see FIG. 7) because and as previously stated and can be seen in FIG. 8, when the pieces (3) are folded during the installation of the bolt, its ends overlap laterally from the perimeter of the drilled hole, penetrating in said cavity.

For the folding of the pieces (3) the tool which can be seen semi-sectioned in FIG. 6 is used.

This tool is made up by a cylindrical piece (9) innerly threaded with the same thread as the stud (1) which, in one of its ends has an hexagonal head to be able to move with a key and in the other has a plain surface, which makes a frontal contact with the piece (10) through an axial bearing or an anti-friction bush (11). The pieces (9 and 10) are kept coupled through an elastic ring (12) Seger type or similar. The piece (10) has a plain frontal surface from which overlaps a small neck which internal and external diameters are respectively the same as that of the stud (1) and the external diameter of the sleeve (5).

During the installation of the bolt, the frontal surface of the piece (10) is supported on the surface of the concrete and its neck is introduced in the drilled hole made on the concrete. The neck of the piece (10) has a length adequate so that, in this position, the groove of the pieces (3) be opposed to the initiation of the cavity existing in the drilled hole.

In order to know that the pieces (3) have reached the folding angle set forth, the movement which the stud (1) has had during the installation is measured. Therefore, the total length of the tool is the adequate so that, when the installation of the bolt is completed, the end of the stud (1) be levelled with the end of the tool (or overlapping a pre-set length).

The installation procedure of the bolt in the drilled hole is the following:

The tool is screwed to the stud (1) until it stops with the sleeve (5) and is introduced along the drilled hole until the front part of the tool is stopped by the concrete surface. In this situation, the groove of the pieces (3) is opposed with the initiation of the cavity of the drilled hole. The tool is rotated, screwing it to the stud (1) with which same is moved towards the outside of the drilled hole (see FIG. 8) so that its trunk-conical head presses on the end of the pieces (3) forcing them to be folded along the groove and be introduced in the cavity of the drilled hole.

At the same time, due to the movement of the stud (1), the fork (6) is moved along it and reaches the throat of said stud (1) when the folding of the pieces (3) is completed, closing around it when it exceeds the echelon existing at the beginning of the throat.

At this stage, the bolt is installed in the drilled hole so that the pieces (3) be inserted inside the cavity of the drilled hole with a certain ease and the sleeve (5) remains, with respect to the surface of the concrete, resunk a depth the same as the length of the neck of the piece (10).

The tool is withdrawn and the piece to be fixed (8) is placed. The nut is tightened with the tightening pair set forth, with which the bolt is moved towards the outside, so that the folded area of the pieces (3) makes pressure in the frontal surface of the cavity. In this position, the sleeve (5) is approximately levelled with the surface of the concrete.

From the whole description previously made, it is understood that, once installed, the bolt makes up a true anchoring, as the axial loads to be supported are transmitted by the head of the stud (1) to the pieces (3) by direct contact. In turn, these pieces (3) transmit them also by direct contact to the frontal surface of the cavity existing in the drilled hole. In this, it differs from the usual expansion bolts in which the transmission of the loads is made by scraping with the concrete surface.

Each of the characteristics previously described participates alltogether with all the others in the operation of the bolt, as briefly described hereunder.

The neck existing in the stud allows the pieces (3) to have a big thickness, with which it is attained that these pieces (3) have the necessary rigidity to transmit the loads.

In turn, the great thickness of the pieces (3) hinders that the head of the stud (1) comes out sliding between said pieces (3) though these be nailed in the concrete, when the latter is smashed by the pressure they exert on it.

The existence of an echelon in the initiation of the neck of the stud (1) allows that once the pieces (3) have been folded, the elastic fork (6) be closed in said neck, uniting the bush (5) and the stud (1) in-between, and hindering that the whole of the bolt be disarmed and that the pieces (3) be displaced.

The gearing between the grooves of the pieces (3) and those of the head and the neck of the stud (1) sets forth an anti-rotation system which allows the tightening of the stud during the folding of the pieces (3).

The adjustment of the end of the pieces (3) between the stud (1) and the sleeve (5) hinders that these pieces, once geared, be ungeared.

The existence of an area of the pieces (3) which, once folded, adopts a trunk-conical shape, allows that a full contact with the head of the stud and with the surface of the widening of the drilled hole be established, with which it is attained a better transmission of the loads to be supported.

The remaining part of the pieces (3) exerts an internal pressure in the walls of the drilled hole, banding innerly the mostly stressed area of the concrete, with which it is hindered that said walls fall by the force exerted by the folded areas of the pieces (3).

It is not considered necessary to make this description more extensive so that any expert in the art understands the scope of the invention and the advantages derived from same.

The materials, shape, size and disposition of the elements will be susceptible from variation provided this means an alteration to the essentiality of the invention.

The terms under which this specification has been described must be always taken in a broad non limitative sense.

I claim:

1. An anchoring device for mooring a mounting element in a mounting hole with an undercut in a substrate, the device comprising:
   an elongated mounting element having a stud portion, a neck portion diametrically smaller than said stud portion and extending axially therefrom so as to form a transition edge portion therebetween, and a trunk-conical head portion having a base diametrically wider than said neck and a head end diametrically smaller than said base, said head portion extending axially from said neck and having a trunk-conical shape;
   a sleeve slidably mounted on said stud portion, said sleeve having a lower edge;
   means for preventing said sleeve from axially moving together with said mounting element in a direction in which said mounting element is being withdrawn out of the hole;
   a plurality of bushing members axially positionable simultaneously on said neck and head portions, said bushing members engaging said lower edge of said sleeve so that an end portion of said bushing members is between said sleeve and said mounting element, said members having an external surface with a perimetrical groove; and means for holding said mounting element and said sleeve against each other to thereby hinder said mounting element and said bushing members from axially sliding relative to each other and including elastic means and a perimetral slot in said sleeve accomodating said elastic means therein, said mounting element being axially slidable relative to said sleeve from a fully extended position, in which said bushing members are against said neck but not yet against said trunk-conical head portion, to a withdrawn position, in which said bushing members are against said trunk conical-head portion to thereby obtusely bend outward against the undercut of the hole at an angle equal to that of a conicity of said trunk-conical head portion and said neck portion is opposite said elastic means so that said elastic means elastically closes onto said neck portion to wedge between said transition edge portion and said perimetral slot of said sleeve and thereby hinders said mounting element and said bushing members from axially sliding relative to each other.

2. The device as defined in claim 1, wherein said mounting element moves independent of said sleeve when axially sliding along said sleeve; and further comprising:

anti-rotation means for hindering said bushing members from rotating by themselves when said mounting element moves independent of said sleeve and including striated surfaces, said neck portion and said head portion having external side surfaces forming said striated surfaces, said external side surface of said head portion with said striated surface having a conical shape, said bushing members having a longitudinal internal surface having another of said striated surfaces which meshes simultaneously with said striated surfaces of said external side surfaces of said head portion and said neck portion.

3. The device as defined in claim 1, wherein said elastic means includes an elastic element, said sleeve having a surface with a sleeve groove dividing said sleeve, said elastic element being fit into said sleeve groove.

4. The device as defined in claim 3, wherein said sleeve has an inside surface, said sleeve groove being formed in said inside surface of said sleeve so that said elastic element is fittable therein.

5. The device as defined in claim 3, wherein said sleeve has an outside surface, said sleeve groove being formed in said outside surface of said sleeve, said sleeve having a thickness, said sleeve groove perforating all of said thickness so as to separate said sleeve into two diametrically opposite portions, said sleeve groove being formed so that said elastic element is fittable therein.

6. The device as defined in claim 3, wherein said transition edge portion is formed as an abrupt transition between said stud portion and said neck portion at a right angle.

7. The device as defined in claim 1, wherein each of said members have a length equivalent to that of said neck portion.

8. The device as defined in claim 1, wherein said head end and said neck portion are coincident in dimension with each other.

9. The device as defined in claim 1, wherein said members form a hollow cylinder.

10. The device as defined in claim 3, wherein said elastic element is formed as an elastic fork element.

11. The device as defined in claim 1, wherein said hole is bounded by a wall, said wall having an area of greatest stress when said mounting element is in said withdrawn position, said members being formed so that when said members are folded outward in said withdrawn position, said members have a first portion pressed against the undercut of the hole and a remaining portion exerting an internal pressure at the area of greatest stress in the wall of the hole that deters the wall from collapsing due to forces exerted through said first portion against the undercut, said perimetrical groove being arranged between said first and said remaining portions.

12. The device as defined in claim 1, wherein said perimetrical groove is formed to allow said members to fold until reaching an angle coincident with that of a conicity of said stud portion.

13. The device as defined in claim 1, wherein said stud portion is threaded, said preventing means including a first cylindrical piece internally threaded corresponding to and fastened to said threaded stud portion, said piece having an end with a polygonal head and another end forming a plain surface, said polygonal head being movable with a key, said preventing means also including an anti-friction piece being interposed in contact between said plain surface of said first cylindrical piece and one of said plain surfaces of said second piece, other of said plain surfaces having a small neck portion extending therefrom having an internal and external diameter equivalent to that of said sleeve, said preventing means further including an elastic ring coupling said first and second pieces together.

14. A device as defined in claim 13, wherein said small neck portion is formed so as to position said perimetrical groove opposite the undercut of the hole when said neck portion is fully inserted into the hole, said stud and said second piece each having an end that remains out of the hole, said second piece being formed so that said ends which remain out of the hole are coincident with each other when said withdrawn position is reached.

15. A device as defined in claim 1, wherein said stud portion has a threaded end, said end being formed to cooperate with a nut and a washer.

16. A device as defined in claim 1, wherein the hole has a diameter, said head being arranged approximately coincident with the diameter of the hole when said mounting element is inserted into the hole.

17. A device as defined in claim 1, wherein said stud has a transverse cross-section, said base has a diameter larger than a transverse cross-section of said stud portion.

18. A device as defined in claim 1, wherein said head end coincides dimensionally with a part of said neck portion adjacent to said stud, said neck portion part having a diameter smaller than said stud portion.

19. A device as defined in claim 1, wherein said bushing members are formed with a basically prismatic shape.

20. A device as defined in claim 1, wherein said perimetrical groove is formed to both house said elastic element to retain said members against said neck portion and also to constitute a perimetral line of weakening to allow said members to fold outward at an angle equal to that of a conicity of said trunk-conical head, said perimetrical groove dividing said members into two areas each having a different transverse cross-section.

21. A device as defined in claim 1, wherein said sleeve has an inner and outer diameter which is the same as those of said stud portion and said base respectively.

22. A device as defined in claim 1, wherein said stud is formed to have a side surface, said elastic element being formed as an elastic fork with at least two arms, said arms being arranged so as to press over said side surface in two diametrically opposite areas, said arms being elastically openable and movable along said stud surface during the anchoring at least until said withdrawn position is reached, said elastic fork axially blocking between said stud portion and said sleeve when said withdrawn position is reached because of said arms elastically acting in said transition edge portion.

23. The device as defined in claim 2, wherein said striated portion of said neck is formed adjacent to said stud portion.

24. The device as defined in claim 22, wherein a reopening of said elastic fork element is impossible after said elastic fork element acts in said transition edge portion, said transition edge portion constituting an echelon.

25. A device as defined in claim 20, wherein each of said bushing members has a transverse section with an end adjacent to said sleeve, said bushing members having an inner and outer radii that are constant from said end to said perimetrical groove and which increase linearly thereafter so that when said bushing members fold outward, said bushing members have inner and outer surfaces forming cone trunks having a conicity that is the same respectively as said trunk-conical head and the undercut.

26. An anchoring device to be fastened in a hole having a bottom with an enlargement, comprising:
a mounting element having a side surface and having an end formed as a trunk-conical head with a base, a stud portion with a diameter, and a neck portion arranged between said stud portion and said trunk-conical head, said neck portion having a diameter smaller than said diameter of said stud portion so as to form a shoulder between said stud portion and said neck portion;
a sleeve slidably located on said mounting element, said sleeve having a perimetral slot;
an elastic fork in said perimetral slot, said elastic fork having legs constantly pressing on said side surface of said mounting element as said mounting element slides along said sleeve, said elastic fork being formed so that said legs close around said neck portion when said elastic fork is opposite said neck portion due to said mounting element sliding along said sleeve; and
a plurality of flaps extending longitudinally around said neck portion, said flaps being formed basically prismatic so as to be folded outward by said trunk-conical head at the same time said legs close around said neck portion, said shoulder and said neck portion being formed so that said legs remain closed on said neck portion and against said shoulder so that said elastic fork can not skip over said shoulder.

* * * * *